United States Patent [19]
Nishida

[11] Patent Number: 6,040,831
[45] Date of Patent: Mar. 21, 2000

[54] APPARATUS FOR SPACIALLY CHANGING SOUND WITH DISPLAY LOCATION AND WINDOW SIZE

[75] Inventor: Shinsuke Nishida, Tokyo, Japan

[73] Assignee: Fourie Inc., Tokyo, Japan

[21] Appl. No.: 08/793,625

[22] PCT Filed: Jul. 1, 1996

[86] PCT No.: PCT/JP96/01832

§ 371 Date: Feb. 21, 1997

§ 102(e) Date: Feb. 21, 1997

[87] PCT Pub. No.: WO97/03433

PCT Pub. Date: Jan. 30, 1997

[30]     Foreign Application Priority Data

Jul. 13, 1995  [JP]  Japan ..................... 7-200351

[51] Int. Cl.[7] ........................................ G06F 3/14
[52] U.S. Cl. ................ 345/340; 345/342; 345/302
[58] Field of Search ................... 345/302, 340, 345/342, 344

[56]         References Cited

U.S. PATENT DOCUMENTS 5,742,283  4/1998  Kim ........................... 345/302

FOREIGN PATENT DOCUMENTS 4191885  7/1992  Japan ..................... G09G 5/00
4251325  9/1992  Japan ..................... G06F 3/08
 519729  1/1993  Japan ..................... G06F 3/14

OTHER PUBLICATIONS

James and James, "Mathematics Dictionary: Fifth Edition", VanNostrand Reinhold, pp. 279–280, Jun. 1992.

*Primary Examiner*—Mark R. Powell
*Assistant Examiner*—Jeffrey Allen Rossi
*Attorney, Agent, or Firm*—Ladas & Parry

[57]         ABSTRACT

An apparatus for presenting picture and sound with harmony or correspondence therebetween in which first and second pictures are displayed at the same time on the same display screen and sound related to the first and second pictures is concurrently produced with a volume corresponding to the respective display areas of the pictures. When the first picture partially overlaps the second picture, the produced sound corresponds to the actual display areas of the respective pictures.

3 Claims, 6 Drawing Sheets

APPARATUS FOR SPACIALLY CHANGING SOUND WITH DISPLAY LOCATION AND WINDOW SIZE

TECHNICAL FIELD

This invention relates to an apparatus for presenting picture along with sound and, more particularly, to an apparatus having a function to display plural pictures within a display screen and to present sounds related thereto.

BACKGROUND ART

With popularization of personal computers in recent years, an environment of so-called multimedia is being prepared and a lot of software are provided in various media forms. Generally, in the software called "multimedia", pictures are presented along with sounds corresponding thereto. Therefore, personal computers are generally used for the time being as an apparatus for presenting pictures along with sound. However, it is expected in the future that new computer systems in the form where video equipment or audio equipment is assembled therein will be popularized. In addition, it is also expected that a new type of light sign board for advertisement will be developed.

In the case where various pictures are displayed on a display screen of computer, an independent window is opened for displaying an independent picture on the screen and usually it is possible to open plural windows on the screen. In addition, there is generally employed such a configuration capable of arbitrarily designating respective positions and respective sizes of windows. Usually, it is possible to set a position of window and a size of window by operating a mouse.

In a multimedia reproduction system using a general personal computer, as previously described, it is possible to suitably designate positions and sizes of windows for displaying respective pictures (picture images) by operation of mouse. Thus, it is possible to respectively display plural pictures on a display at desired sizes. However, in regard to sound, similarly to the general TV receiver or audio equipment, only the function to adjust sound volume as a whole is provided, but special attention for reproducing multimedia is not drawn. In the software so called multimedia, pictures and sounds are generally presented as respective sets, and it is expected to present a picture and a sound with harmony or correspondence with each other. However, in the conventional or existing systems, while it is possible to respectively present individual pictures (picture images) at desired sizes on the display, it is impossible to carry out sound volume adjustment in a manner harmonized with the presented picture.

In view of the above, an object of this invention is to provide an apparatus for presenting a picture along with sound capable of presenting the picture and sound in a manner such that they are in harmony or correspondence with each other.

SUMMARY OF THE INVENTION (1) A first feature of this invention is directed to an apparatus for presenting a picture along with sound comprising:

a display for displaying a picture;

a speaker for producing a sound;

data supply means for supplying picture data for allowing the display to display a picture and sound data for allowing the speaker to produce a sound;

input means for inputting a designate size of a picture to be displayed; and control means for controlling the display so that a picture is displayed based on the picture data supplied from the data supply means and for controlling the speaker so that a sound is produced based on the sound data supplied from the data supply means;

wherein the control means has a function to adjust magnification of the supplied picture data so that a picture is displayed in a display area having a designated size which is inputted by the input means and has a function to adjust volume of the supplied sound data so that a sound is produced with a volume corresponding to an area of the display area.

(2) A second feature of this invention is directed to the apparatus for presenting a picture along with sound having the first feature:

wherein the data supply means has a function to deliver picture data and sound data related thereto as a set of presentation information and has a function to deliver plural sets of presentation information including individual picture data and individual sound data at the same time;

wherein the input means has a function to independently designate respective sizes for the individual picture data delivered at the same time; and wherein the control means has a function to adjust magnifications of the individual picture data delivered thereto so that pictures are displayed in respective display areas having designated sizes which are inputted by the input means and has a function to adjust volumes of the individual sound data delivered thereto so that sounds are produced with respective volumes corresponding to areas of said respective display areas.

(3) A third feature of this invention is directed to the apparatus for presenting a picture along with sound having the second feature:

wherein the control means has a function to control the display to display individual pictures on a screen on the basis of the individual picture data in such a manner that said individual pictures overlap with each other, to determine actual display areas which are not concealed by other pictures with respect to the individual pictures displayed on the screen and to adjust volumes of the individual sound data delivered thereto so that sounds related to the individual pictures are respectively produced with volumes corresponding to the respective actual display areas.

(4) A fourth feature of this invention is directed to the apparatus for presenting a picture along with sound having any one of the first to the third features:

wherein a relationship between a display area of a picture and a sound volume indicates a monotonously increasing function such that the sound volume monotonously increases with increase of the display area.

(5) A fifth feature of this invention is directed to the apparatus for presenting a picture along with sound having any one of the first to the fourth features:

wherein the apparatus further provides reference sound volume setting means for setting a predetermined reference sound volume; and wherein a sound volume is adjusted so that when a entirety of a picture is displayed with a reference size which is set in advance, a sound is produced with said reference sound volume.

(6) A sixth feature of this invention is directed to an apparatus for presenting a picture along with sound comprising:

a display for displaying a picture;

plural speakers for producing a sound, these speakers being disposed so that relative positions with respect to the display are different from each other;

data supply means for supplying picture data for allowing the display to display a picture and sound data for allowing the speakers to produce a sound;

input means for designating a part area as a designated region in which a picture is to be displayed on a screen of the display; and control means for controlling the display so that a picture is displayed based on the picture data supplied from the data supply means and for controlling the speaker so that a sound is produced based on the sound data supplied from the data supply means;

wherein the control means has a function to deliver a picture signal based on the picture data delivered thereto to the display so that a picture is displayed within the designated region designated by the input means and has a function to deliver sound signals based on the sound data delivered thereto to the speakers so that a sound image corresponding to a relative position of the designated region with respect to an entire region of the screen is produced.

(7) A seventh feature of this invention is directed to the apparatus for presenting a picture along with sound having the sixth feature:

wherein the data supply means has a function to deliver picture data and sound data related thereto as a set of presentation information and has a function to deliver plural sets of presentation information including individual picture data and individual sound data at the same time;

wherein the input means has a function to independently designate respective designated regions for the individual picture data delivered at the same time; and wherein the control means has a function to deliver a picture signal based on the individual picture data delivered thereto to the display so that individual pictures are displayed within the respective designated regions designated by the input means, to determine relative positions of the respective designated regions with respect to an entire region of the screen and to deliver sound signals based on the individual sound data delivered thereto to the speakers so that respective sound images corresponding to the relative positions are produced.

(8) An eighth feature of this invention is directed to the apparatus for presenting a picture along with sound having the first or the second feature:

wherein the plural speakers are constituted by at least two speakers of a left speaker disposed on a left side of the display and a right speaker disposed on a right side of the display; and wherein sound signals are delivered so that when a central position of a designated region for a specific picture is getting more deviated to the left side relative to a central position of the entire region of the screen, a volume of the left speaker with respect to a sound related to said specific picture is getting greater than a volume of the right speaker with respect to a sound related to said specific picture and when a central position of a designated region for said specific picture is getting more deviated to the right side relative to the central position of the entire region of the screen, a volume of the right speaker with respect to a sound related to said specific picture is getting greater than a volume of the left speaker with respect to a sound related to said specific picture.

BEST MODE FOR CARRYING OUT INVENTION

In the apparatus according to this invention, size designation of a picture to be displayed is carried out by input means, thereby making it possible to display a picture at an arbitrary size on the display similarly to the conventional apparatus. In addition, at this time, a sound related to the picture is adjusted so that the sound volume corresponds to the display area of the picture displayed on the display. Accordingly, if the picture is displayed in an enlarged manner on the display, the sound volume becomes greater in dependency upon the enlarged picture display. In contrast, if the picture is displayed in a contracted manner, the sound volume becomes lower in dependency upon the contracted picture display. For this reason, the picture and sound are presented in such a manner that they are in harmony or correspondence with each other.

Moreover, in the case where plural pictures are displayed on the display, sounds related to respective pictures are presented at sound volumes corresponding to the display areas of the respective pictures. Namely, the sound related to a picture displayed in an enlarged manner is presented with a high sound volume, and the sound related to a picture displayed in a contracted manner is presented with a low sound volume. For this reason, even in the case where plural sets of presentation each consisting of a picture and sound related thereto are prepared to present them at the same time, the pictures and sounds are respectively presented in a form such that the display areas and the sound volumes correspond to each other. For this reason, individual presentations are respectively presented such that the pictures and sounds are in harmony or correspondence with each other.

Moreover, in the apparatus according to this invention, it is possible to designate, by input means, a region where a picture is to be displayed, and it is thus possible to display a picture within an arbitrary designated region on the display. In addition, at this time, if a system having plural speakers is used, it is possible to present sounds from the plural speakers so that a sound image of a particular sound related to a particular picture is produced at a particular position corresponding to a position of said particular picture. Accordingly, presentation can be made wherein a position of a picture and a position of a sound image are caused to be in harmony or correspondence with each other.

Figure 1:
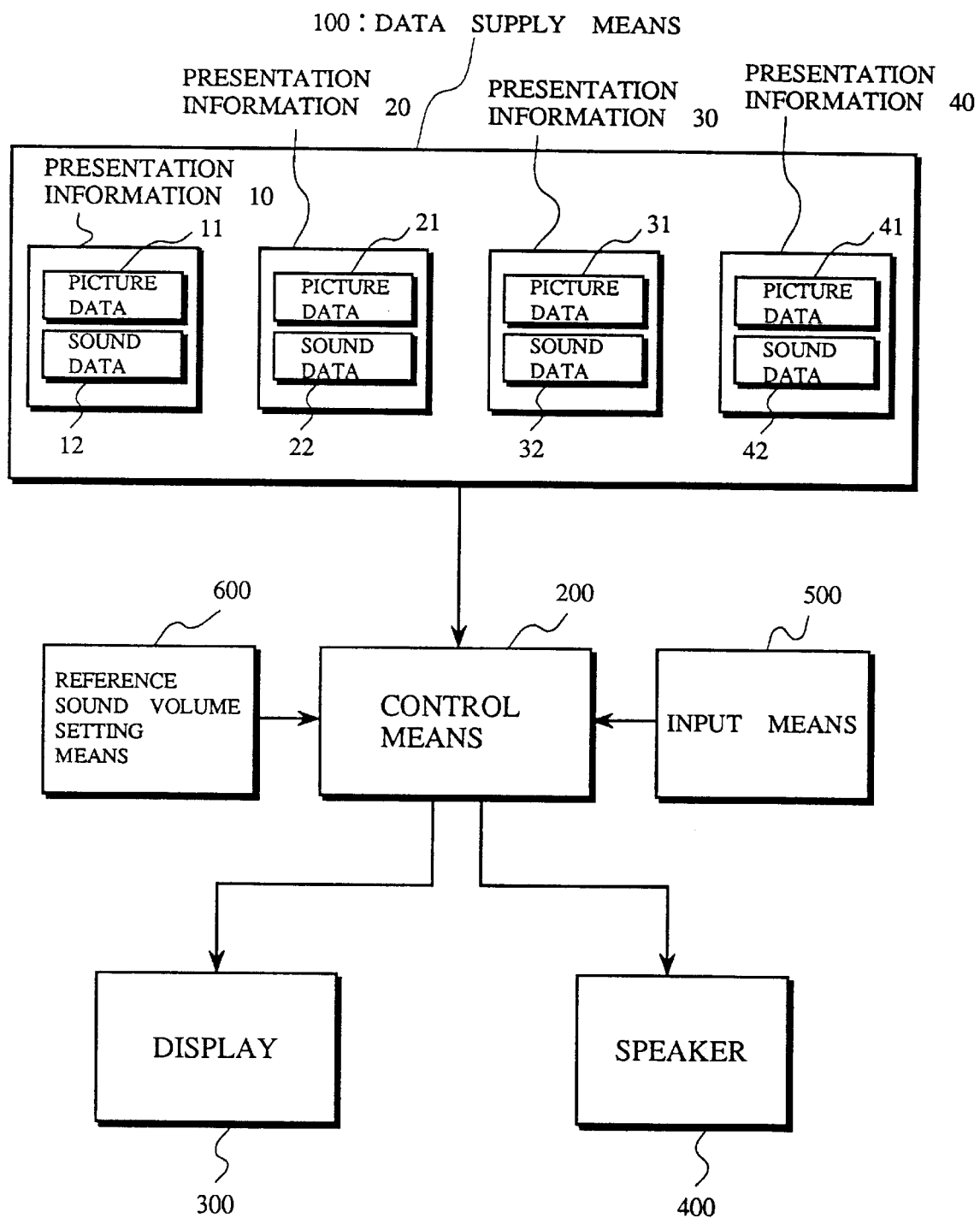
FIG. 1 is a block diagram showing the fundamental configuration of an apparatus for presenting a picture along with sound according to an embodiment of this invention.

This invention will now be described in accordance with the following embodiment. FIG. 1 is a block diagram showing a fundamental configuration of the apparatus for presenting picture along with sound, according to one embodiment of this invention. This apparatus is constituted by data supply means 100, control means 200, a display 300, a speaker 400, input means 500, and reference sound volume setting means 600. The data supply means 100 is means having a function to deliver presentation information consisting of picture data and sound data. In this embodiment, four sets of presentation information 10, 20, 30, 40 can be presented. Respective sets of presentation information 10, 20, 30, 40 include picture data 11, 21, 31, 41 and sound data 12, 22, 32, 42, respectively. These sets of presentation information 10, 20, 30, 40 are delivered to the display 300 and the speaker 400 through the control means 200. Namely, the picture data 11, 21, 31, 41 are delivered to the display 300 and predetermined pictures are respectively displayed on the display screen. On the other hand, the sound data 12, 22, 32, 42 are delivered to the speaker 400 and predetermined sounds are respectively produced from the speaker.

The input means 500 is a unit for inputting a designate size of a picture displayed on the display 300. The control means 200 has a function to carry out magnification adjustment to the picture data 11, 21, 31, 41 delivered from the data supply means 100 so that a picture is displayed with a size designated by the input means 500 and to deliver the adjusted data to the display 300. In addition, in this embodiment, the input means 500 has a function to input information relating to a display position of picture, and the control means 200 controls the display 300 so that a picture is displayed based on a size and a position designated by the input means 500.

On the other hand, the reference sound volume setting means 600 is means for setting a predetermined reference sound volume. It should be noted that sound data delivered from the data supply means 100 is not necessarily outputted from the speaker 400 with this reference sound volume. The control means 200 has a function to adjust a sound volume with respect to sound data delivered thereto so that a sound is produced with a sound volume corresponding to a display area of a picture displayed on the display 300, and a sound volume of a sound outputted from the speaker 400 is essentially determined in accordance with the display area of the picture related to the sound. It is to be noted that in the case where the entirety of a picture is displayed with a reference size which is set in advance (the maximum size in this embodiment), a sound volume is adjusted to the reference sound volume which is set in the reference sound volume setting means 600. In other words, a reference sound volume which is set in the reference sound volume setting means 600 determines a sound volume serving as a reference (a sound volume when the entirety of picture is displayed at the maximum size).

The control means 200 is supplied with plural sets of presentation information from the data supply means 100, thus making it possible to deliver them to the display 300 and the speaker 400. Accordingly, plural picture data can be displayed at the same time on the screen of the display 300. Moreover, plural sound data can be outputted from the speaker 400 at the same time. The input means 500 can respectively independently carry out size designation with respect to these plural picture data, and the control means 200 executes respective magnification adjustments with respect to individual picture data and executes respective sound volume adjustments with respect to sound data corresponding thereto.

Individual elements shown in FIG. 1 are constituted in practice by a commonly used personal computer system. Namely, the control means 200 can be realized by particular software combined with hardware including CPU and memory of this computer, and the display 300 and the speaker 400 are respectively realized by commonly used display and speaker connected to the computer. In addition, the input means 500 is realized by an input equipment such as a mouse or a keyboard connected to the computer, and the reference sound volume setting means 600 is realized by a volume trimmer in hardware or a sound volume adjustment function in software for controlling the speaker 400.

On the other hand, various media may be used for the data supply means 100. A picture data may be a still picture data or a moving picture data. Any types of picture data with any formats may be employed as far as the data can be handled by the control means 200. Similarly, any types of sound data with any formats may be employed as far as the data can be handled by the control means 200. Accordingly, as a physical constituent of the data supply means 100, there may be employed not only commonly used information recording equipments for computer such as a hard disc unit, a CD-ROM drive unit, or an MO drive unit, etc., but also a video reproducing unit, an audio reproducing unit, or a receiving unit of the TV broadcast, wired broadcast or satellite broadcast, etc.

Figure 2A:
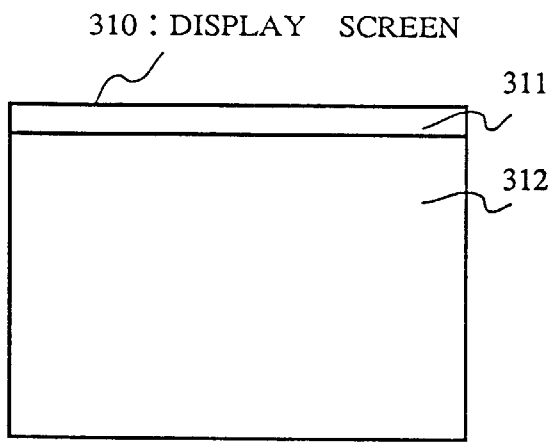
FIG. 2A shows a blank picture display area of the display corrected to the computer.
Figure 2B:
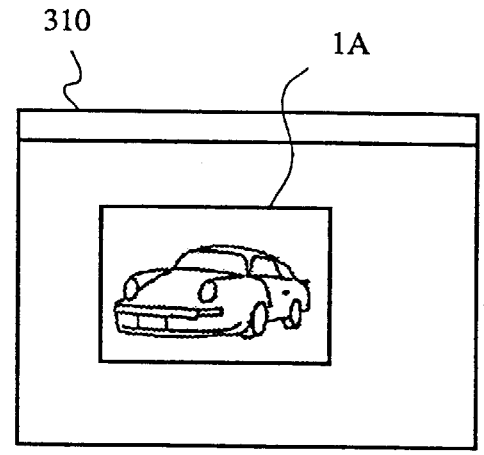
FIG. 2B shows a single picture displayed on the screen.

The operation of this apparatus will now be described while exemplifying a more practical picture displayed on a screen 310 of the display 300. FIG. 2A is a front view showing a typical form of the screen 310 of the display connected to the computer. On the upper portion of the screen, a control region 311 is provided. In this region, a command menu is displayed. When an operator clicks a particular command by a mouse in this command menu displayed in the control region 311, it is possible to input the particular command into the computer. A display region 312 provided under the control region 311 is a region for actually displaying a picture image based on a picture data delivered from the data supply means 100. The operator could input an instruction for displaying a desired picture with a desired position and a desired size by using a mouse of the input means 500. FIG. 2B shows an example of presentation based on the presentation information 10. In FIG. 2B, there is shown the state where a picture 1A is displayed within a predetermined window on the basis of the picture data 11. It is now assumed that the entire area of the display region 312 shown in FIG. 2A is represented by a numeric value of 100% as the maximum display area, and it is further assumed that the display area of the picture 1A shown in FIG. 2B is 30% with respect to the maximum display area. In this case, sound based on the sound data 12 is outputted from the speaker 400 with a sound volume of 30% of the reference sound volume which has been set in the reference sound volume setting means 600.

Figure 3A:
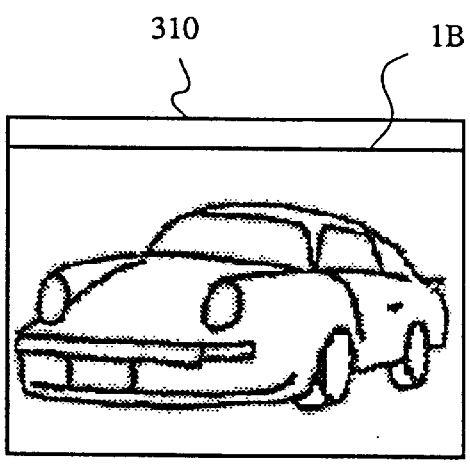
FIGS. 3A and 3B are views respectively showing a picture displayed in an enlarged manner and in a contracted manner with respect to the state shown in FIG. 2B.
Figure 3B:
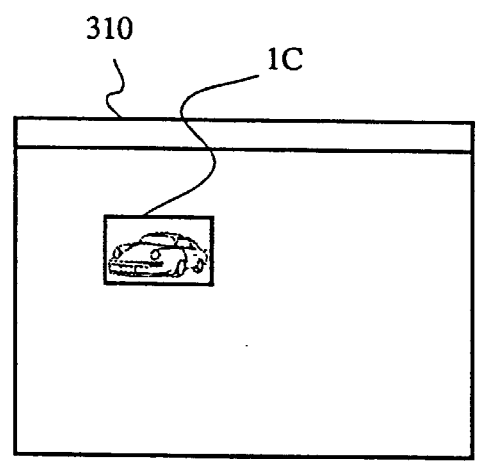

The position and the size of the window where the picture 1A is displayed can be arbitrarily changed by an operation of the mouse as the input means 500. FIG. 3A shows the state where an enlarged picture 1B obtained by enlarging the picture 1A is displayed so that the display area is increased up to the maximum area of 100%, and FIG. 3B shows the state where a contracted picture 1C obtained by contracting the picture 1A is displayed so that the display area is reduced to the area of 10%. The feature of this invention resides in that when the display area of the picture is changed in this way, the sound volume is automatically changed in dependency upon such a change. Namely, in the display form shown in FIG. 3A, the sound volume is also increased so as to take a value of 100% (i.e., the reference sound volume value which has been set in the reference sound volume setting means 600). In the display form shown in FIG. 3B, the sound volume is also decreased so as to take a value of 10%. When the sound volume is automatically changed in dependency upon the display area of the picture in this way, an operator feels that the picture and the sound are in harmony or correspondence with each other. In addition, when a picture is displayed in an enlarged manner, it is expected that the operator is more greatly interested in that picture. Accordingly, an automatic operation to increase the sound volume with increasing display area of the picture is considered to conform with the intention of the operator. As stated above, it is meaningful that the automatic sound volume adjustment corresponding to the size of the picture results in improvement in operability.

Such a control can be easily carried out by the control means 200. Namely, the control means 200 takes a particular presentation information (presentation information in the case of this example) from the data supply means 100 on the basis of instruction from the input means 500. Then the control means 200 executes magnification adjustment is to the picture data 11 based on the size designated. For example, if the picture data 11 is a picture data in a raster form, it is sufficient for carrying out enlargement processing to carry out interpolation of pixel, and it is sufficient for carrying out contraction processing to carry out thinning of pixel. Then, a proper display area on the screen 310 is calculated so that the picture with an adjusted size can be displayed. In the case of the example of FIG. 2B, a value of 30% is obtained with respect to the maximum display area. Then a drive signal based on the sound data 12 is delivered to the speaker 400 so that a sound related to that picture is outputted with a sound volume of 30% of the reference sound volume set in the reference sound volume setting means 600.

Figure 4:
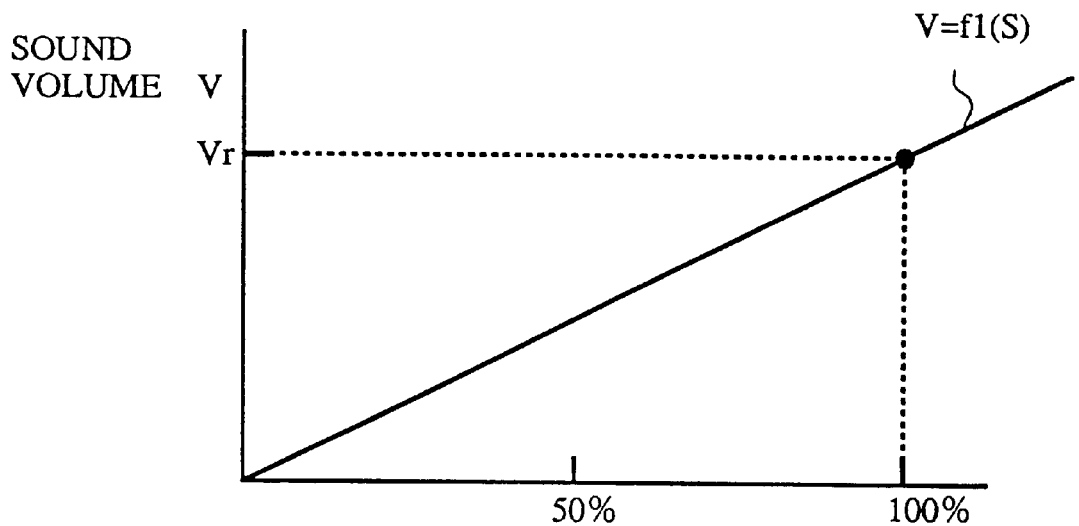
FIG. 4 is a graph showing an example of the linear relationship between a display area S of a picture and sound volume V utilized in this invention.
Figure 5:
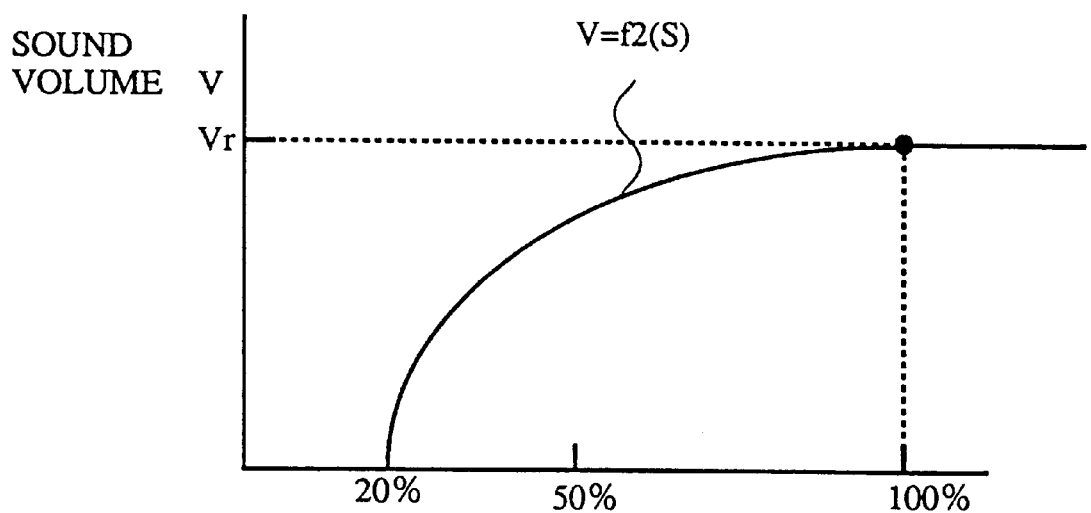
FIG. 5 is a graph showing an example of the increasing relationship between a display area S of a picture and sound volume V utilized in this invention.

FIG. 4 is a graph showing an example of the correlation between a display area S of picture and a sound volume V. In this example, the relationship therebetween is a linear relationship expressed as $V=f1(S)$. In the graph, a sound volume value Vr is a reference sound volume set in the reference sound volume setting means 600. When setting of the reference sound volume Vr is changed, a gradient of the graph is changed. However, it is not necessarily required that the correlation between the display area S and the sound volume V is a linear relationship as shown in the graph of FIG. 4. FIG. 5 is an example where setting of a non-linear relationship expressed as $V=f2(S)$ is made. In this example, when the display area S is less than 20%, the sound volume V becomes equal to zero, with the result that no sound is outputted. Accordingly, e.g., in the display form as shown in FIG. 3B, no sound is outputted. Such a setting is convenience in the case where only confirmation of picture is needed in a soundless state. Moreover, according to the relationship shown in FIG. 5, the sound volume V is saturated at the reference sound volume Vr even if the display area S becomes more than 100%. As a result, there is no possibility that the sound volume is increased any more. Accordingly, even if a picture is caused to be enlarged so that the entirety of the picture exceeds the maximum size and only a portion of the picture is displayed on the screen, there is no increase in the sound volume. In other words, the sound volume does not become greater than the reference sound volume Vr by any means and it is possible to prevent the sound volume from infinitely increasing. Thus, it can be prevented that sound is outputted with a large sound volume contrary to the intention of the operator.

As stated above, it is not necessarily required that the correlation between the display area S and the sound volume V is a linear relationship, but it is preferable to make a setting such that the relationship therebetween indicates a monotonically increasing function in which the sound volume V increases with increase of the display area S. With setting a monotonic relationship as stated above, when a display area S is gradually increased, a sound volume V also increases accordingly. As a result, the sound volume V may not be diverted in the decrease direction by any means. Accordingly, the sound volume adjustment is suitable for the operator.

Figure 6A:
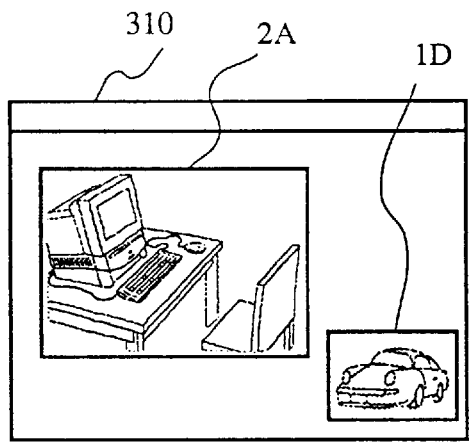
FIGS. 6A and 6B are views showing pictures of diferent size displayed on the screen of the display connected to the computer.

The operation in the case where plural presentation information is presented at the same time will now be described. Recent computers have a function to simultaneously execute plural software programs and to simultaneously open plural files thus to display plural windows at the same time on the same screen. For example, FIG. 6A shows the state where presentation information 10 and presentation information 20 are presented at the same time. In this example, a picture 1D is displayed on the basis of picture data 11 included in the presentation information 10 and a picture 2A is displayed on the basis of picture data 21 included in the presentation information 20. As previously described, positions and sizes of windows to be used for such picture displays are designated by the input means 500 comprised of a mouse. In this case, sound data included in individual presentation information are respectively presented with sound volumes corresponding to display areas of pictures corresponding to respective picture data. For example, assume that the first picture 1D is displayed in a display area of 15% and the second picture 2A is displayed in a display area of 40% and a linear function $V=f1(S)$ as shown in FIG. 4 is set. In this case, as the reference sound volume Vr is assumed to be a sound volume of 100%, the sound data 12 related to the first picture 1D is presented with a sound volume of 15% and the sound data 22 related to the second picture 2A is presented with a sound volume of 40%. From a view point of the operator, a sound related to a large picture is presented with a large volume (loudness) and a sound related to a low picture is presented with a small volume. Therefore, the picture and a sound are in harmony or correspondence with each other.

Figure 6B:
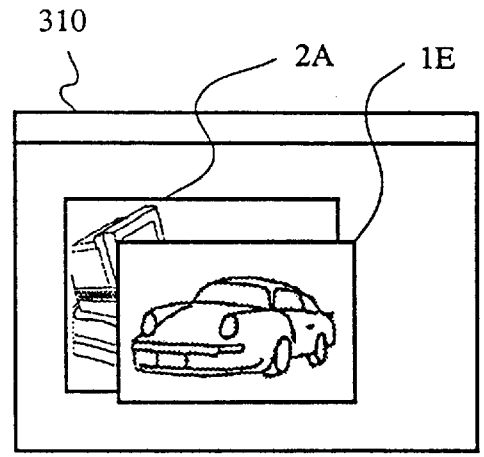

It is to be noted that when plural windows are presented on the same screen at the same time, they are sometimes displayed in a manner overlapping with each other. In such a case, it is preferable to determine a display area on the basis of an actual display area which is not concealed by the other pictures and to carry out sound volume adjustment so that a related sound is produced with a sound volume corresponding to the actual display area. It is now assumed that, e.g., the first picture 1D is enlarged in the state shown in FIG. 6A to change it into a picture 1E as shown in FIG. 6B. In this case, if the display area of the first picture 1E is increased to take a value of 30%, the sound data 12 is presented with a sound volume which is also increased to take a value of 30%. At this time, a portion of the second picture 2A is hidden behind the first picture 1E. When the actual display area of the second picture 2A is assumed to be decreased to take a value of 10%, the sound data 22 is presented with a sound volume which is also decreased to take a value of 10%. As described above, the sound volume adjustment based on an actual display area is preferable because it is in correspondence with instinct of the operator.

Figure 7A:
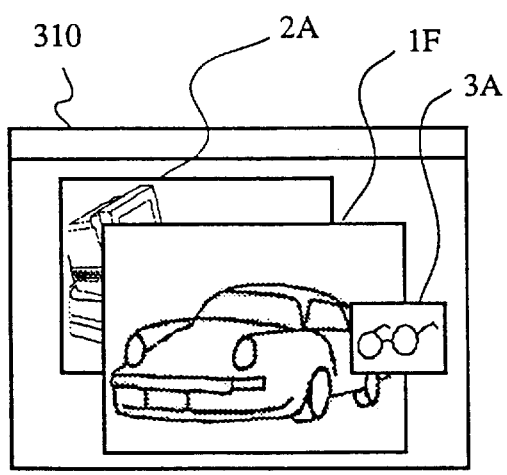
FIGS. 7A and 7B are views showing three pictures displayed on the screen of the display connected to the computer.

This invention can be applied not only to the case where two presentation information are presented at the same time, but also to the case where three presentation information or more are presented at the same time. For example, FIG. 7A shows the state where three presentation information 10, 20, 30 are presented at the same time. In this example, the first picture 1F is displayed in the actual display area of 60%, the second picture 2A is displayed in the actual display area of 8%, and the third picture 3A is displayed in the actual display area of 5%. Accordingly, in the case where a linear function $V=f1(S)$ as shown in FIG. 4 is set, the sound data 12 related to the first picture 1F is presented with a sound volume of 60%, the sound data 22 related to the second picture 2A is presented with a sound volume of 8%, and the sound data 32 related to the third picture 3A is presented with a sound volume of 5%.

Figure 7B:
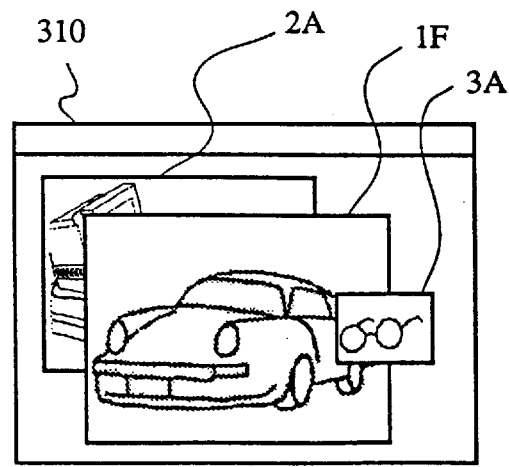

However, when the number of presentation information becomes great as stated above, a large number of sound data are presented in a synthesized manner. Therefore, when the operator listens to the synthesized sound as a whole, it becomes difficult to discriminate respective sounds. In view of this, it is effective to selectively present only a sound data related to a picture on the screen of which display area is the largest. FIG. 7B shows the example where such selective sound presentation is employed. While the screen of FIG. 7B is the same as that of FIG. 7A, only a sound related to the first picture 1F of which display area is the largest is outputted with a sound volume of 60% and the other sounds are not outputted at all (a sound volume is 0%) in FIG. 7B. It is to be noted that similar effect can be realized also by a way of definition of the correlation between the display area S of picture and the sound volume V. For example, if a correlation as shown in FIG. 5 is defined, since the sound volume becomes equal to 0% when the display area S is less than 20%. Accordingly, even if a large number of pictures are displayed at the same time, when there is only one picture which has a display area above 20%, only a sound related to such a single picture is outputted.

Figure 8:
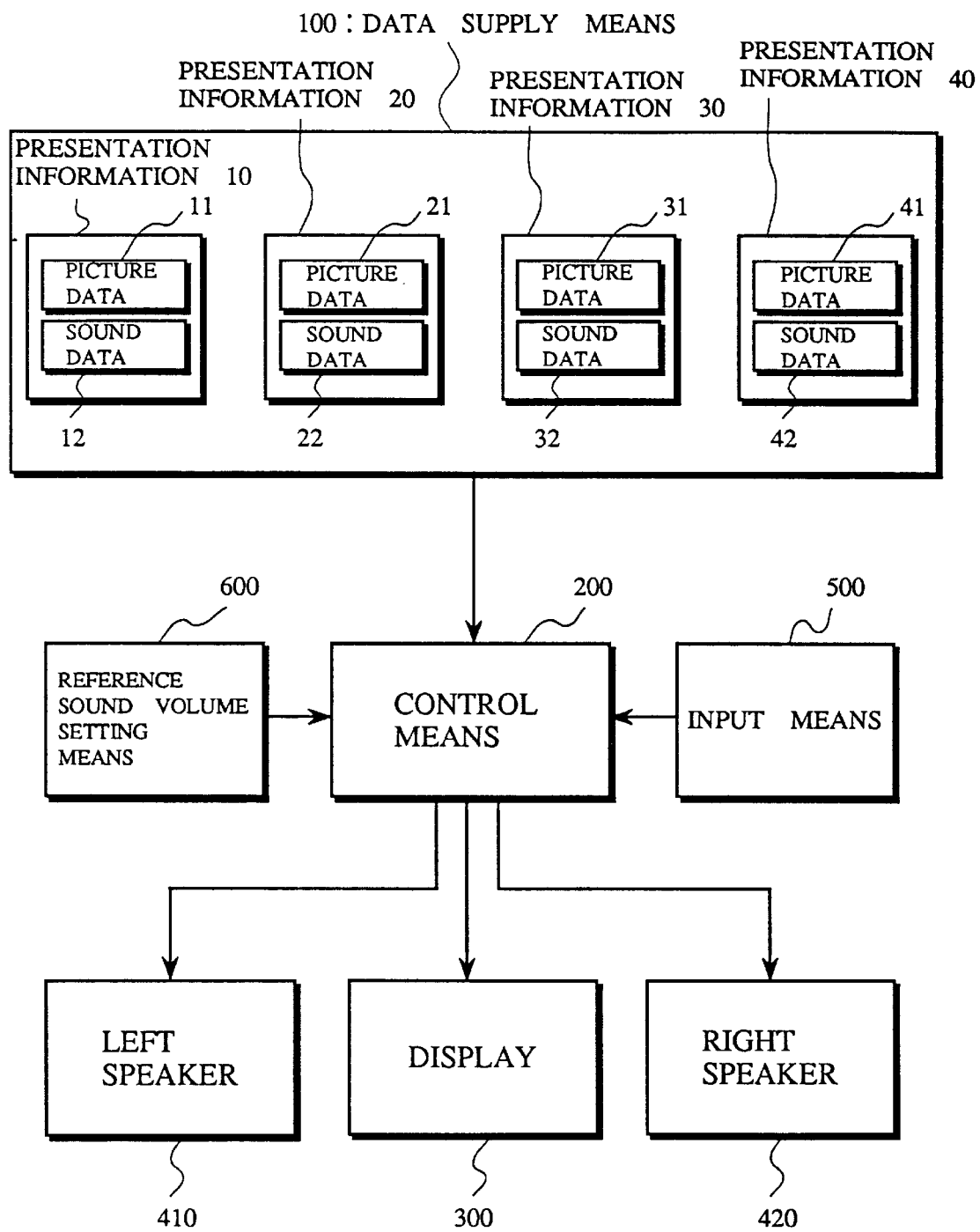
FIG. 8 is a block diagram showing a fundamental configuration of an apparatus for presenting a picture along with sound according to another embodiment of this invention.

Subsequently, another embodiment of this invention will be described. FIG. 8 is a block diagram showing the fundamental configuration of the apparatus for presenting picture along with sound according to another embodiment. The configuration of this apparatus is substantially the same as that of the apparatus shown in FIG. 1, but is different from the latter in that plural speakers are provided. Namely, a left speaker 410 is. provided at the left side of the display 300 and a right speaker 420 is provided at the right side thereof. In other words, there exist plural speakers disposed so that relative positions with respect to the display 300 are different from each other. In this configuration, when an approach is employed to adjust sound volumes of the individual speakers so that a position of a sound image corresponds to a display position of a picture, it is possible to produce harmony or correspondence between a picture and a sound. The operation based on this approach will be described in detail below.

Figure 9:
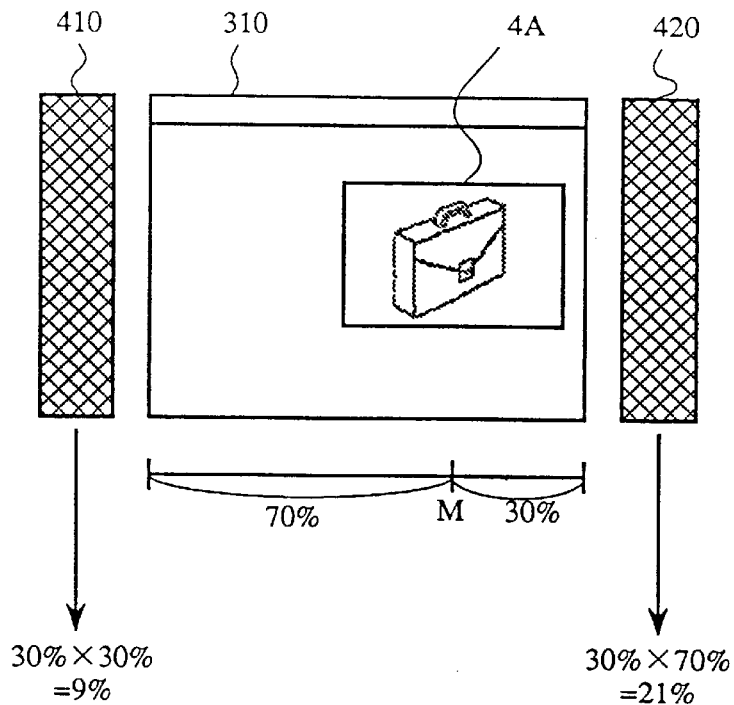
FIG. 9 is a view showing the relationship between sound volumes of left and right speakers when a picture is displayed on the screen of the display in the apparatus shown in FIG. 8.

Similarly to the apparatus shown in FIG. 1, also in the apparatus shown in FIG. 8, a designating size and a designating display position with respect to a specific picture is inputted by the input means 500. Let now consider the case where the fourth picture 4A is displayed on the screen 310 in a display area of 30%, as shown in FIG. 9, for example. In this case, in the previously described apparatus shown in FIG. 1, a sound related to the picture 4A is outputted from the speaker 400 with a sound volume of 30%. In contrast, in the apparatus shown in FIG. 8, sounds are outputted from the left and right speakers 410, 420 so that a sound image corresponding to the display position of the picture 4A is produced. In the example of FIG. 9, since the picture 4A is displayed at the position slightly closer to the right of the screen 310, sound volume distribution such that an output volume of the right speaker 420 is greater than that of the left speaker 410 is made so that a sound image of a sound related to the picture 4A is placed at the position slightly closer to the right side.

This operation will now be described in more practical. In the following explanation, a region where a picture is displayed on the basis of a designation inputted from the input means 500 is called designated region. In the example shown in FIG. 9, the rectangular region corresponding to the contour of the picture 4A is the designated region. When a designated region with respect to the picture 4A is determined, the control means 200 delivers sound signals based on the sound data 42 to the left speaker 410 and the right speaker 420 so that a sound image corresponding to the relative position of the designated region with respect to the entire display region of the screen 310 is produced. In the example shown in FIG. 9, the lateral width of an entire display region is assumed to be 100% and a central position M of the designated region is located at a position of 70% from the left and 30% from the right. In view of the above, in the apparatus of this embodiment, the entire sound volume of 30% (corresponding to the display area of picture 4A) is proportionally distributed by inverse proportional ratio of 70%:30% to determine sound volumes of the left and right speakers 410, 420. Namely, a sound volume of the left speaker 410 is caused to be 30%×30%=9% and a sound volume of the right speaker 420 is caused to be 30%×70%= 21%. The total sound volume of both the speakers becomes equal to 9%+21%=30%, which is the value corresponding to the display area of the picture 4A. Thus the balance between the left and the right is weighted to the right side and a sound image deviates slightly to the right side.

Figure 10:
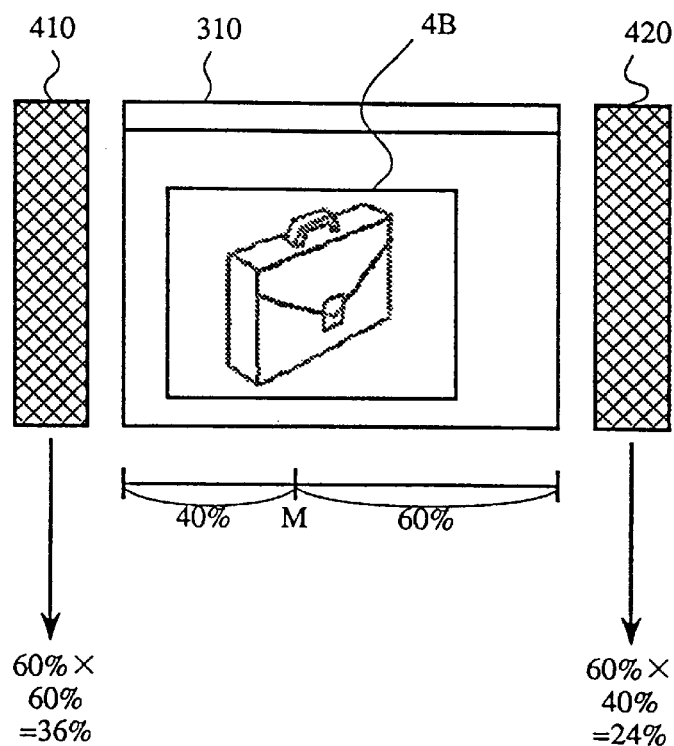
FIG. 10 is a view showing the relationship between sound volumes of left and right speakers when a picture is displayed on the screen of the display in another form in the apparatus shown in FIG. 8.

Now let assume that a size and a display position of the picture 4A are changed as shown in FIG. 10 to display a picture 4B in a display area of 60%. At this time, the central position M of the designated region is assumed to be changed to a position of 40% from the left and 60% from the right. In this condition, a sound volume of the left speaker 410 becomes equal to 60%×60%=36%, and a sound volume of the right speaker 420 becomes equal to 60%×40%=24%. The total sound volume of both the speakers becomes equal to 36%+24%=60%, which is the value corresponding to the display area of the picture 4B. Thus the balance between the left and the right is weighted to the left side and a sound image deviates slightly to the left side.

In the above-described example, a picture balance between left and right of the central position M of the designated region and a sound balance between left and right are to simply linearly correspond to each other. However, it is not necessarily required that the both balances are caused to linearly correspond to each other. As long as a viewer can recognize that the picture balance between the left and right display position of the picture and the sound balance between the left and right sound image position are caused to correspond to each other, any correspondence relationship may be defined.

Moreover, while in the example described above, only the single presentation information 40 is presented, in the case where plural presentation information are presented at the same time, it is sufficient to determine plural central positions M of respective designated regions with respect to individual pictures to display and a synthetic sound based on delivered plural sound data is outputted from individual speakers so that sounds related to the individual pictures produce respective sound images corresponding to the central positions M.

Further, while two speakers are provided at the left and right sides of the display 300 in the above-mentioned example, two speakers can be provided at the upper and lower positions of the display 300. In this upper and lower location, it is sufficient that a picture balance in upper and lower directions and a sound balance in upper and lower directions are caused to correspond to each other. It is a matter of course that in the case where four speakers are provided in upper and lower directions and in left and right directions, or also in the case where speakers more than four are provided, this invention can be applied thereto. In short, the fundamental idea of this invention resides in that in the case where plural speakers are provided at the periphery of the display, a sound image corresponding to a picture position is prepared by these plural speakers. This invention may be implemented in any form as long as implementation dose not deviate from the above-mentioned fundamental idea.

While this invention has been described in accordance with the embodiments shown, this invention is not limited to these embodiments, but may be carried out in various forms in addition to the above. For example, the example where this invention is applied to the multimedia reproduction system using a personal computer is disclosed in the above-described embodiments, but this invention may be applied also to general TV image receivers. Recently, a TV image receiver having a function to display multiple windows on a screen is on a market. In this TV image receiver, several TV programs can be represented on a same screen at the same time. If this invention is applied to such a TV image receiver, a sound relating to a main program presented in a large window is outputted with a large volume and a sound relating to a sub program presented in a small window is outputted with a small volume. Besides, sounds can be provided from both the left and right speakers with a predetermined sound balance in dependency upon the display position of the picture.

Moreover, in recent years, personal computers capable of receiving TV broadcast to display a TV program have been popularized. This invention can also be applied to such personal computers. In this case, an audience can easily select a presentation feature. For example, he/she could set a small window for receiving a news program with a small volume of sound, or he/she could set a large window for receiving a cinema program with a large volume of sound.

Further, this invention can be applied also to a display device in which a large number of light emitting elements (light bulbs or LEDs, etc.) such as a light sign board or an advertisement board, etc. provided in the street. In such display devices, large pictures and small pictures are usually displayed in the mixed state and power consumption greatly depends upon the total display area of pictures. In view of the above, it has a great meaning to apply this invention to such display devices. According to the present invention, sound and a picture are presented in harmony or correspondence with each other. In short, this invention can be applied also to any types of apparatuses for presenting picture along with sound.

As described above, in accordance with this invention, since an approach is employed to present a sound with a sound volume corresponding to a display area of a picture and to produce a sound image corresponding to a display position of a picture, it becomes possible to present picture and sound with a feeling such that they are in harmony or correspondence with each other.

Industrial Applicability

This invention can be widely utilized in systems for providing sound and picture at the same time such as multimedia reproduction systems using a personal computer, general TV image receivers, light sign boards or advertisement boards provided in the street, and the like.

What is claimed is:

1. An apparatus for presenting a picture along with sound comprising:

a display for displaying pictures;

a speaker for producing sounds;

data supply means for supplying plural sets of presentation information, each set of presentation information including picture data for allowing the display to display a picture and sound data for allowing the speaker to produce sound;

input means for inputting respective designated positions and respective designated sizes for respective picture data; and control means for controlling the display so that pictures are displayed based on picture data supplied from the data supply means and for controlling the speaker so that sounds are produced based on sound data supplied from the data supply means;

said control means having;

a first function to adjust respective magnifications of the picture data so that pictures are displayed in respective display areas having said respective designated sizes;

a second function to display individual pictures in said respective display areas located at said respective designated positions on a screen on the basis of adjusted picture data, a part of a picture being concealed by other pictures when they are overlapped;

a third function to determine actual display areas which are not concealed on the screen for said individual pictures; and a fourth function to adjust volumes of the sound data so that sounds related to said individual pictures are respectively produced with volumes corresponding to said actual display areas of said individual pictures.

2. An apparatus for presenting picture along with sound as set forth in claim 1, wherein said control means establishes a relationship between the display area of a picture and the sound volume in which the sound volume monotonically increases with increase of the display area.

3. Apparatus for presenting picture along with sound as set forth in claim 1, further comprising:

reference sound volume setting means for setting a predetermined reference sound volume; and wherein sound volume is adjusted so that when an entire picture is displayed with a reference size which is set in advance, sound is produced with said reference sound volume.

* * * * *